Feb. 6, 1945.  W. L. POLLARD  2,368,873
TRANSMISSION
Filed April 17, 1942   2 Sheets-Sheet 1
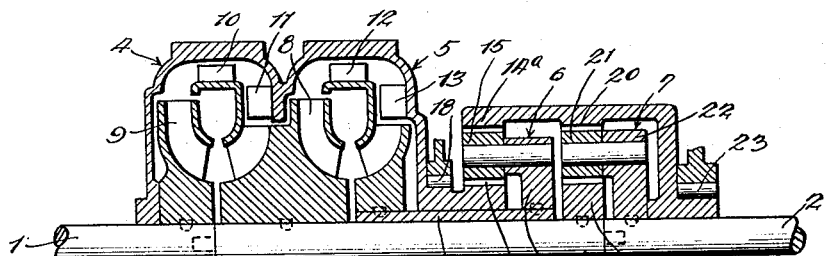

Feb. 6, 1945.  W. L. POLLARD  2,368,873
TRANSMISSION
Filed April 17, 1942  2 Sheets-Sheet 2
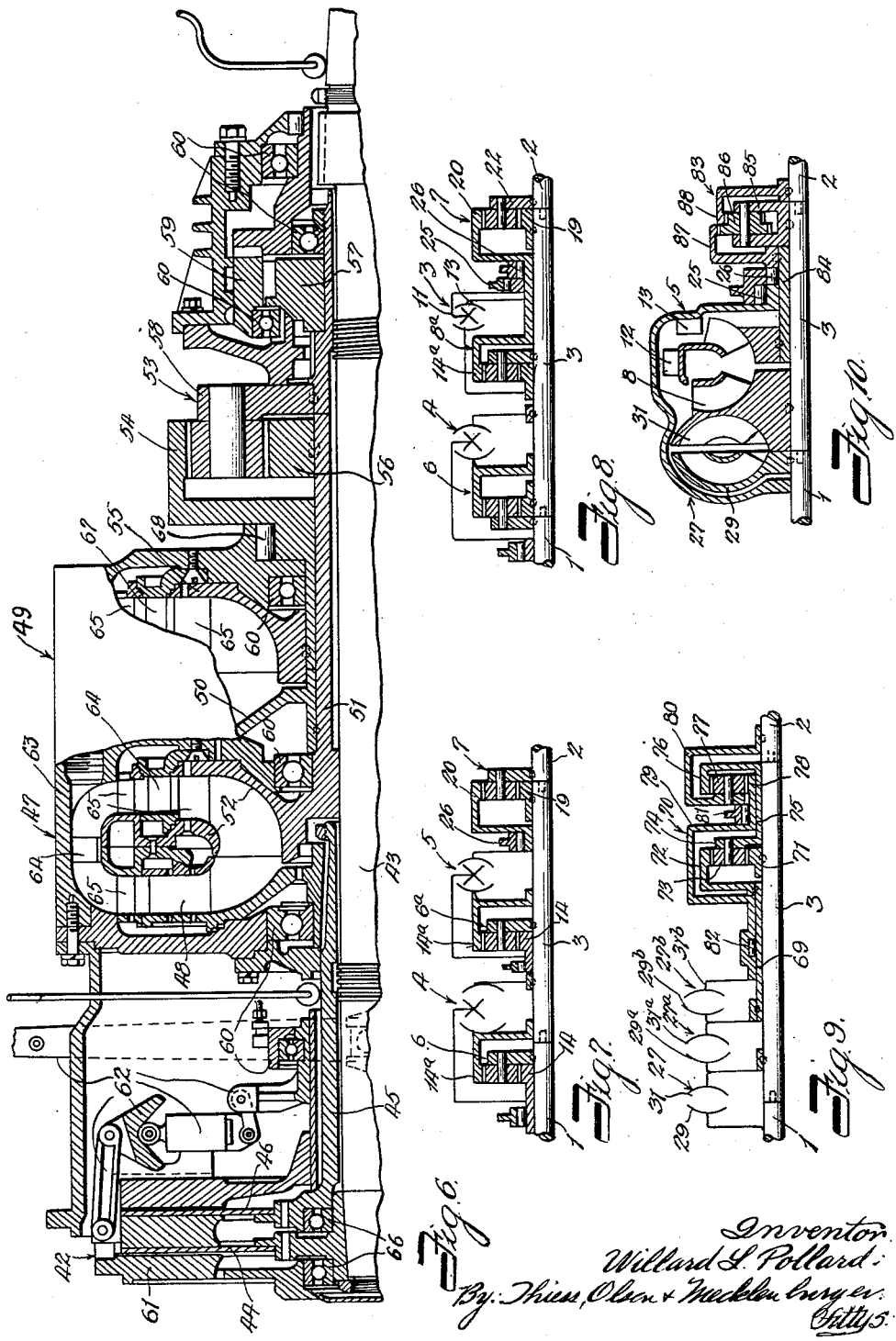

Patented Feb. 6, 1945

2,368,873

UNITED STATES PATENT OFFICE 2,368,873

TRANSMISSION

Willard L. Pollard, Evanston, Ill.

Application April 17, 1942, Serial No. 439,365

7 Claims. (Cl. 74—189.5)

My invention relates to hydraulic transmissions.

One of the objects of my invention is to provide an improved hydro-planetary transmission which will have a long torque ratio range.

A further object is to provide an improved hydro-planetary transmission which will have a high starting torque.

A further object of my invention is to provide an improved hydro-planetary transmission which will have a long torque ratio range and a continuous power flow.

A further object is to provide an improved hydro-planetary transmission which will have a long torque ratio range and continuous power flow, and in which the use of control clutches or brakes is avoided.

Further objects and advantages of the invention will be apparent from the description and claims.

In the drawings in which several forms of my invention are shown,

Figure 1 is an axial sectional view showing one form of hydro-planetary transmission;

Figs. 2, 3, and 4 show, respectively, axial sections of other forms;

Fig. 5 is a view showing characteristic curves obtainable from some of these transmissions;

Fig. 6 is an axial sectional view of another form of hydro-planetary transmission; and Figs. 7, 8, 9, and 10 show, respectively, axial sections of other forms.

Referring to Fig. 1 in detail, the construction shown comprises an input shaft 1, an output shaft 2, an intermediate shaft 3, a torque converter 4, a torque converter 5 in tandem power flow relation to the converter 4, a planetary gear 6 for effecting premature transformation to coupling action of the converters 4 and 5, and a planetary gear 7 for combining the divided power flow from the pump 8 to the output shaft 2. The front converter comprises the pump rotor 9 keyed to the shaft 1, the turbine rotor 10 keyed to the shaft 3, and the one-way rotatable turbo-stator 11. The torque converter 5 comprises a pump 8, the turbine rotor 12, and the stator-rotor 13. The planetary 6 comprises the sun gear 14 connected with the stator 13, the ring gear 14a, the planet gearing 15 meshing with the sun gear and ring gear, and the gear carrier 16 on which the planet gearing 15 is mounted. The gear carrier 16 is fast to the sleeve 17 to which the turbine rotor 12 is secured. A one-way anchor 18 is provided to prevent reverse rotation of the stator 13.

The planetary gear 7 comprises the sun gear 19 keyed to the intermediate shaft 3, to which the pump rotor 8 is secured, the ring gear 20, planet gearing 21 meshing with the sun gear and ring gear, and a gear carrier 22 fast to the output shaft 2. A one-way anchor 23 is provided to prevent reverse rotation of the ring gear.

In operation, assuming that the car is standing still, in the first stage the pump rotor 9 will pass an increased torque to the turbine 10 which, for example, might be 4:1, and this will be transmitted to the sun gear 19. The torque will again be multiplied by, for example, three in the planetary unit 19, 20, 21, and 22, since the ring gear 20 is held against reverse rotation. This will give an over-all torque ratio of 12:1. During the slow speed of the pump rotor 10, very little drag will be exerted on the pump rotor 8 but as the speed of the pump rotor 8 increases, a point will be reached when the turbine 12 will begin to rotate, after which there will be a divided power flow from the turbine rotor 10. One branch will pass through the torque converter 5, sleeve 17, planetary gearing 6, ring gear 20, and planet gearing 21 to the gear carrier 22. The other branch will be from the turbine rotor 10, through the intermediate shaft 3 to the sun gear 19. The torque and efficiency curve for this construction will be approximately as shown in Fig. 5. The front planetary gearing 6 may be omitted if desired, in which case the shaft 17 would be connected directly to the ring gear 20. The purpose of the front planetary 6 is to provide a premature transformation from converter action to coupler action of the converters 4 and 5. A transmission using some such power circuit might be advantageous in tanks where high initial torque is needed and where it might be desirable to get rid of all clutches and brakes.

The construction shown in Fig. 2 is in general similar to that shown in Fig. 1, comprising the input shaft 1, the output shaft 2, the intermediate shaft 3, the converters 4 and 5, and the planetary 7. One-way anchors 24, 25, and 26 are provided to prevent reverse rotation of the stators 11 and 13 and of the ring gear 20. In both of these forms it will be noted that the second stage pump 8 and sun gear 19 are connected to rotate as a unit with the primary stage turbine 10 and that the ring gear 20 is connected so as to be driven by the second stage turbine 12 and is held against reverse rotation by a one-way anchor. The operation of this form is broadly similar to that of Fig. 1, it being noted that in both forms the turbine of the first converter drives the pump of the second converter and that each turbine of the two converters drives an element of a planetary gearing, one of which elements is held against reverse rotation by a one-way anchor.

The construction shown in Fig. 3 is similar in general to that shown in Fig. 1, except that in Fig. 3 a hydraulic coupler 27 is substituted for the hydraulic torque converter 5. This construction comprises the input shaft 1, the output shaft 2, the intermediate shaft 3, the torque converter 4, the hydraulic coupler 27 and the planetary gearing 28. The coupler pump 29 and the ring gear 30 rotate as a unit with the turbine rotor 10. The coupler turbine 31 rotates as a unit with the sun gear 32. The gear carrier 33 rotates with the output shaft 2. A one-way anchor 34 is provided to prevent reverse rotation of the sun gear 32.

In this form, assuming that the car is standing still, in the first stage of movement power flow will be through the converter 4, intermediate shaft 3, ring gear 30 and gear carrier 33 to the output shaft 2, the sun gear 33 being held against reverse rotation. This will give two stages of torque multiplication—one in the converter 4 and the other in the planetary 28. When the drag on the pump 29 becomes great enough with the increasing speed to start the turbine rotor 31 to rotating, power flow will be divided between the turbine rotor 10 and output shaft 2, one branch going through the intermediate shaft 3 and ring gear 30 and the other branch going through the coupler 27 and sun gear 32. This form might be useful for truck drives, as it would have two torque multiplications in series in the low gear range.

The construction shown in Fig. 4 is in general like that shown in Fig. 3, except that here two hydraulic couplers are arranged in tandem. The construction shown comprises the input shaft 1, the output shaft 2, the intermediate shaft 3, a duplex tandem hydraulic coupler 35, and a planetary gearing 7. The duplex tandem coupler comprises a pump rotor 36 fast to the input shaft 1, a turbine rotor 37 keyed to the intermediate shaft 3, a second pump rotor 38 which may be integral with the turbine rotor 37, and a second turbine rotor 39 keyed to the hollow shaft 40 on which the ring gear 20 is mounted. A one-way anchor 41 is provided to prevent reverse rotation of the ring gear 20. In this form, when the car is standing still during the first stage of action, power flow will be mainly from the turbine rotor 37 to the sun gear 19 as there is very little drag on the pump rotor 38 during the slow movement stage of the turbine 37. As the turbine 37 picks up in speed, the drag on the pump 38 will increase until it is of sufficient amount to start the turbine rotor 39 to moving, after which there will be divided power flow, one branch going to the ring gear 20 and the other branch going to the sun gear 19.

The construction shown in Fig. 6 comprises a twin disc clutch construction 42, a shaft 43 rotatable with one of the clutch discs 44 for direct drive, a tubular shaft 45 rotatable with the other clutch disc 46 for hydro-planetary drive, a first hydraulic torque converter 47, the pump rotor 48 of which is secured to the tubular shaft 45 on which the clutch disc 46 is mounted, a second hydraulic torque converter 49, the pump rotor 50 of which is keyed to the tubular shaft 51 on which the first turbine rotor 52 is mounted, a planetary gearing 53, the ring gear 54 of which is connected to rotate with the turbine rotor 55 of the second torque converter, and the sun gear 56 of which is connected to rotate with the turbine rotor 52 of the first torque converter, a one-way driving clutch member 57 secured to rotate with the gear carrier 58 of the planetary gearing, and a one-way driven clutch member 59 secured to rotate with the direct drive shaft 43. Suitable antifriction bearings 60 are provided for the various rotating parts.

The twin disc clutch construction comprises a driving head 61 which may be connected with the motor, the two alternatively connectible discs 44 and 46 to which reference has been made, and mechanism 62 for selectively and alternatively connecting one or the other of the clutch discs 44 or 46 to rotate with the driving head 61.

The first hydraulic torque converter 47 comprises the nonrotatable casing 63 to which the guide or stator blades 64 are secured, the pump rotor 48, and the turbine rotor 52 to which the turbine blades 65 are secured.

The second hydraulic torque converter comprises the pump rotor 50 and turbine rotor 55, to which reference has previously been made, and the nonrotatable casing 63 carrying the guide or reactance blades 67. The ring gear 54 is held against rotation in a direction reverse to that of the pump 50 by means of the one-way anchor 68.

In this form, assuming that the car is initially stationary, the first stage of power flow will be from the converter turbine 52 to the sun gear 56, the ring gear 54 being held against reverse rotation by the one-way anchor 68. This will give a torque multiplication of 5:1 in the converter and perhaps 3:1 in the planetary, giving an over-all torque ratio of 1:15. As the speed of the turbine 52 and pump 50 increases, a point will be reached when the drag on the pump 50 will be sufficient to start the ring gear 54 to moving, after which there will be a divided power flow as in the forms previously described. When a sufficient speed has been obtained, the clutch 42 may be operated to eliminate the fluid drive action, giving a direct drive through the shaft 43.

The construction shown somewhat diagrammatically in Fig. 7 comprises a drive shaft 1, a driven shaft 2, an intermediate shaft 3, a first hydraulic torque converter 4, a first planetary gearing 6 for effecting advanced transformation from converter action to coupler action of the converter 4, a second torque converter 5, a second planetary 6a for effecting advanced transformation of the second torque converter 5, and a third planetary gearing 7, the ring gear 20 of which is connected to the turbine rotor of the second torque converter 5 and held against reverse rotation by the one-way anchor 26 and the sun gear 19 of which is keyed to the intermediate shaft 3 and the gear carrier of which is secured to the driven shaft 2. The gear carrier of the first planetary gearing 6 is keyed to the drive shaft 1, and the gear carrier of the second planetary gearing 6a is keyed to the intermediate shaft 3. The operation of this form will be substantially like that of Figs. 1 and 2.

The construction shown in Fig. 8 comprises a drive shaft 1, a driven shaft 2, an intermediate shaft 3, a first planetary gearing 6 for effecting a divided power flow through and around the first hydraulic torque converter 4, a second planetary gearing 8a for effecting an advanced transformation from converter action to coupler action of the second torque converter 3, and a third planetary gearing 7, the ring gear 20 of which is rotatable with the tubular shaft on which the ring gear 14a of the second planetary gearing 6a and the turbine rotor 13 of the second torque converter are secured, the sun gear 19 of which is keyed to the intermediate shaft 3 and the gear carrier 22 of which is keyed to the driven shaft 2. One-way anchors 25 and 26 may be provided for preventing reverse rotation of the one-way stator rotor 11 and ring gear 20.

The operation of this form is broadly similar to that of Figs. 1, 2, and 7, in that the turbine of the first converter drives the pump of the second converter and that each turbine of the two converters drives an element of a planetary gearing, one of which elements is held against reverse rotation by a one-way anchor.

The construction shown in Fig. 9 comprises a drive shaft 1, a driven shaft 2, an intermediate shaft 3, a first hydraulic coupler 27, the pump rotor 29 of which is secured to the drive shaft 1, a second hydraulic coupler 27a, the pump rotor of which is rotatable with the turbine of the first coupler and with the intermediate shaft 3, a third hydraulic coupler 27b, the pump rotor of which is rotatable with the turbine rotor 31a of the second coupler and with the tubular shaft 69, and a compound planetary gearing construction 70. The compound planetary gearing construction comprises a sun gear 71 keyed to the intermediate shaft 3, a ring gear 72 keyed to the tubular shaft 69, planet gearing 73 meshing with the sun gear 71 and ring gear 72, a gear carrier 74 on which the planet gearing 73 is mounted, a sleeve 75 rotatable with the gear carrier 74, a ring gear 76 rotatable with the sleeve 75, planet gearing 77 meshing with the sun gear 78 and ring gear 76, a tubular drum or sleeve 79 rotatable with the sun gear 78 and with the turbine rotor 31b of the third coupler, and a gear carrier 80 on which the planet gearing 77 is mounted, keyed to the driven shaft 2. A one-way anchor 81 is provided to prevent reverse rotation of the sun gear 78, and a one-way clutch 82 is provided to prevent the drum or sleeve 70 from overrunning the tubular shaft 69 on which the ring gear 72 is mounted.

In this form, assuming that the car is standing still and that the motor is running at an effective speed, in the first stage or condition of the transmission the pump rotor 29 of the first coupler will pick up in speed until the turbine rotor 31 of the first coupler begins to move. This will cause rotation of the sun gear 71. Rotation of the sun gear 71 will cause a slow rotation of the gear carrier 74 and consequently of the ring gear 76, since the ring gear 72 is held against reverse rotation by the clutch 82 and anchor 81. This will cause a still lower rotation of the driven shaft 2 as the sun gear 78 is held against reverse rotation by the one-way anchor 81. As the speed of the intermediate shaft 3 increases, the pump rotor 29a of the second coupler will become effective to cause the turbine 31a of the second coupler to rotate and to carry with it the ring gear 72. This will increase the speed of the gear carrier 74, sleeve 75 and ring gear 76, the sun gear 78 being still held against reverse rotation by the anchor 81. This is the second stage or condition of the transmission. As the turbine 31a of the second coupler 27a increases in speed, the pump rotor 29b of the third turbine will become effective to cause the turbine rotor 31b of the third coupler to begin to move, carrying with it the sun gear 78 of the planetary gearing. This is the third stage or condition of the transmission. The first stage may give a torque multiplication of about 5:1 depending upon the proportions of the planetary gearing. The second stage may give a maximum torque multiplication of 1.5:1, again depending on the gear proportions. The third stage will give no torque multiplication, but as the speed of the turbines increases it will give almost a 1:1 speed ratio.

The construction shown in Fig. 10 comprises a drive shaft 1, a driven shaft 2, intermediate shaft 3, a hydraulic coupler 27, a hydraulic torque converter 5 in series with the coupler, and a planetary gearing 83 in series with the hydraulic transmission. The hydraulic coupler comprises a pump rotor 29 keyed to the drive shaft 1 and a turbine rotor 31 keyed to the intermediate shaft 3. The hydraulic torque converter comprises the pump rotor 8 rotatable with the turbine rotor 31 of the coupler, a turbine rotor 12 keyed to a sleeve 84 surrounding the intermediate shaft 3, and a stator-rotor 13 held against reverse rotation by the one-way anchor 25.

The planetary gearing 83 comprises a gear carrier 85 keyed to the intermediate shaft 3, duplex planet gearing 86 carried by the gear carrier, a ring gear 87 meshing with the larger gear portion of the duplex gearing 86 and keyed to the sleeve 84, and a ring gear 88 meshing with the smaller gear portion of the duplex gearing 86 and keyed to the driven shaft 2. One-way anchors 25 and 26 are provided for preventing reverse rotation of the stator-rotor and ring gear 87, respectively. The duplex planet gearing may be designed to give any desired speed reduction between the intermediate shaft 3 and the driven shaft 2 when the ring gear 87 is stationary. For example, if a torque increase of 1:10 is desired, the pitch diameters of the two portions of the duplex planet gear 86 is made such that the ratio of the difference in the pitch radii of the two portions of the duplex gear to the pitch radius of the larger gear portion, multiplied by the ratio of the pitch radius of the gear carrier 85 to the pitch radius of the ring gear 88, equals one-tenth.

In operation, if the car is initially standing still and the drive shaft 1 is rotating at an effective speed during the first stage of operation, the pump rotor of the coupler will increase in speed until the turbine rotor of the coupler begins to rotate, carrying with it the gear carrier of the planetary. As the ring gear is held against reverse rotation by the anchor, the driven shaft 2 will be driven at a speed of one-tenth the speed of the intermediate shaft 3. As the turbine rotor of the coupler increases in speed, the pump rotor of the hydraulic converter will begin to be effective to cause rotation of the turbine rotor of the converter. This will cause the ring gear to begin to rotate so that thereafter there is a divided power flow from the turbine of the coupler, one path being through the hydraulic converter and ring gear to the duplex planet gearing and the other path being through the intermediate shaft 3 and to the gear carrier of the planetary gearing. This will give a maximum torque multiplication of approximately 5:1.

Further modifications will be apparent to those skilled in the art and it is desired, therefore, that the invention be limited only by the scope of the appended claims.

Having thus described my invention, what I claim and desire to secure by Letters Patent is:

1. A hydraulic planetary transmission comprising two hydraulic torque converters, each comprising a pump rotor, a turbine rotor and a reactance guide, the pump rotor of the second converter being positively driven from the turbine rotor of the first converter, planetary gearing comprising a sun gear positively driven from one of said turbine rotors, a ring gear positively driven from the other turbine rotor, a gear carrier and planet gearing mounted on said gear carrier and meshing with said sun gear and ring gear, and a one-way anchorage for preventing reverse rotation of the gear driven from the second turbine rotor.

2. A hydraulic planetary transmission comprising two hydraulic torque converters, each comprising a pump rotor, a turbine rotor and a reactance guide, the pump rotor of the second converter being positively driven from the turbine rotor of the first converter, planetary gearing comprising a sun gear positively driven from one of said turbine rotors, a ring gear positively driven from the other turbine rotor, a gear carrier and planet gearing mounted on said gear carrier and meshing with said sun gear and ring gear, a driving member, a shaft extending through said converters, clutch means for connecting and disconnecting said shaft with respect to said driving member, and clutch means for connecting and disconnecting said gear carrier with respect to said shaft.

3. A hydraulic planetary transmission comprising two hydraulic torque converters, each comprising a pump rotor, a turbine rotor and a reactance guide, the pump rotor of the second converter being positively driven from the turbine rotor of the first converter, planetary gearing comprising a sun gear positively driven from one of said turbine rotors, a ring gear positively driven from the other turbine rotor, a gear carrier and planet gearing mounted on said gear carrier and meshing with said sun gear and ring gear, a driving member, a shaft extending through said converters, clutch means for connecting and disconnecting said shaft with respect to said driving member, and one-way clutch means for connecting and disconnecting said gear carrier with respect to said shaft.

4. A hydraulic planetary transmission comprising two hydraulic torque converters, each comprising a pump rotor, a turbine rotor and a reactance guide, the pump rotor of the second converter being positively driven from the turbine rotor of the first converter, and planetary gearing comprising a sun gear positively driven from one of said turbine rotors, a ring gear positively driven from the other turbine rotor, a gear carrier and planet gearing mounted on said gear carrier and meshing with said sun gear and ring gear, one of said reactance guides comprising a stato-rotor and a one-way anchorage for preventing reverse rotation of said stato-rotor.

5. A hydraulic planetary transmission comprising two hydraulic torque converters, each comprising a pump rotor, a turbine rotor and a reactance guide, the pump rotor of the second converter being positively driven from the turbine rotor of the first converter, and planetary gearing comprising a sun gear positively driven from one of said turbine rotors, a ring gear positively driven from the other turbine rotor, a gear carrier and planet gearing mounted on said gear carrier and meshing with said sun gear and ring gear, each of said reactance guides comprising a stato-rotor and one-way anchorage means for preventing reverse rotation of both of said stato-rotors.

6. A hydro-planetary transmission comprising a drive shaft, a driven shaft, an intermediate one-piece unitary shaft, a first hydraulic torque transmission unit including a first pump rotor driven from said drive shaft and a first turbine rotor actuated by liquid from said first pump rotor and secured to said unitary shaft, a second hydraulic torque transmission unit including a second pump rotor driven positively by said first turbine rotor and secured to said unitary shaft, and a second turbine rotor actuated by liquid from said second pump rotor, a planetary gearing comprising three elements (1) a first gear, (2) a second gear, and (3) a gear carrier and planetary gearing carried thereby and meshing with said gears, said gear carrier being secured to said driven shaft, said first gear being secured to said unitary shaft and positively driven by said first turbine rotor, said second gear being positively driven by said second turbine rotor, and one-way anchorage means for holding said second gear against reverse rotation with respect to said second turbine rotor, said intermediate unitary shaft extending through and supporting said first turbine rotor, said second pump rotor, said second turbine rotor, and said first gear.

7. A hydro-planetary transmission comprising a drive shaft, a driven shaft, an intermediate one-piece unitary shaft, a first hydraulic torque transmission unit including a first pump rotor driven from said drive shaft and a first turbine rotor actuated by liquid from said first pump rotor and secured to said unitary shaft, a second hydraulic torque transmission unit including a second pump rotor driven positively by said first turbine rotor and secured to said unitary shaft, and a second turbine rotor actuated by liquid from said second pump rotor, a planetary gearing comprising three elements (1) a sun gear, (2) a ring gear, and (3) a gear carrier and planetary gearing carried thereby and meshing with said gears, said gear carrier being secured to said driven shaft, said sun gear being secured to said unitary shaft and positively driven by said first turbine rotor, said ring gear being positively driven by said second turbine rotor, and one-way anchorage means for holding said ring gear against reverse rotation with respect to said second turbine rotor, said intermediate unitary shaft extending through and supporting said first turbine rotor, said second pump rotor, said second turbine rotor, and said sun gear.

WILLARD L. POLLARD.